United States Patent [19]

Christopher et al.

[11] Patent Number: 5,431,846
[45] Date of Patent: Jul. 11, 1995

[54] COPOLYMERS AND DETERGENT COMPOSITIONS CONTAINING THEM

[75] Inventors: David J. Christopher, Ormskirk; Alfred R. Elmes, Wirral; Sigrun Eriksen, Wirral; Ezat Khoshdel, Wirral; Derek G. Savill, Nr Chester, all of United Kingdom

[73] Assignee: Lever Brothers Company, Division of Conopco, Inc., New York, N.Y.

[21] Appl. No.: 155,716

[22] Filed: Nov. 22, 1993

Related U.S. Application Data

[63] Continuation-in-part of Ser. No. 65,326, May 20, 1993, abandoned.

[51] Int. Cl.$^6$ .......................... C11D 3/37; C08F 22/02
[52] U.S. Cl. .................................. 252/174.24; 526/318
[58] Field of Search ..................... 526/318; 252/174.24

[56] References Cited

U.S. PATENT DOCUMENTS

| | | |
|---|---|---|
| 3,055,873 | 9/1962 | Hull et al. |
| 3,268,491 | 8/1966 | Hattori et al. |
| 3,405,060 | 10/1968 | Carter et al. |
| 4,022,960 | 5/1977 | Mima et al. |
| 4,522,370 | 11/1986 | Bardoliwalla et al. |
| 4,659,793 | 4/1987 | Yang |
| 4,725,655 | 2/1988 | Denzinger et al. |
| 5,055,540 | 10/1991 | Hughes et al. .................... 526/318.2 |
| 5,100,980 | 3/1992 | Hughes et al. .................... 526/318.2 |
| 5,223,592 | 6/1993 | Hughes et al. .................... 526/318.2 |
| 5,268,437 | 12/1993 | Holy et al. ....................... 526/318.2 |

FOREIGN PATENT DOCUMENTS

| | | |
|---|---|---|
| 0193360 | 9/1986 | European Pat. Off. |
| 0497611 | 8/1992 | European Pat. Off. |
| 0506246 | 9/1992 | European Pat. Off. |
| 0552876 | 7/1993 | European Pat. Off. |
| 42-1793 | 1/1967 | Japan ................................. 526/318.2 |
| 46-28417 | 8/1971 | Japan ................................. 526/318.2 |
| 1054755 | 1/1967 | United Kingdom |
| 1374592 | 11/1974 | United Kingdom |
| 1385131 | 2/1975 | United Kingdom |
| 1530397 | 10/1978 | United Kingdom |
| 2114990 | 9/1983 | United Kingdom |
| 2168062 | 6/1986 | United Kingdom |

OTHER PUBLICATIONS

Derwent Abstract of JP 61246294.
Derwent Abstract of JP 63272347.
Marvel, C. S. et al., "Polymerization Reactions of Itaconic Acid and Some of its Derivatives", *Polymerization of Itaconc Acid.* May 1959, vol. 24, pp. 599–605.
Higuchi, A. et al., "D.S.C. Investigation of the States of Water in Poly(vinyl alcohol-co-itaconic acid) Membranes", *Polymer,* Nov. 1985, vol. 26, p. 1833.
Kotzeva, L., "On the Kinetics and Mechanism of Copolymerization of Vinyl Acetate and Itaconic Monomers", *Journal of Polymer Science: Part A: Polymer Chemistry,* (1980), vol. 27, p. 1325.
Kotzeva, L. et al., "A Study of Thermal Degradation Kinetics and Mechanism of Vinyl Acetate and Itaconic Acid Copolymers", *Journal of Applied Polymer Science,* (1989), vol. 38, p. 1439.
Higuchi, A. et al., "Membrane Potentials and Permeation of NaCl in Poly(vinyl Alcohol-co-Itaconic Acid) Membranes", *Journal of Applied Polymer Science,* (1986), vol. 31, pp. 419–421.
Higuchi, A. et al., "Permeation of Solutes in Water-Swollen Poly(vinyl Alcohol-co-Itaconic Acid) Membranes", *Journal of Applied Polymer Science,* (1986), vol. 32, pp. 3229–3231.
International Search Report in International Application No. PCT/EP 93/01242.
Great Britain Patent Office Search Report.
Derwent Abstract of JP 05059114.
Derwent Abstract of EP 444 230.
Derwent Abstract of JP 2163149.

*Primary Examiner*—Joseph L. Schofer
*Assistant Examiner*—N. Sarofim
*Attorney, Agent, or Firm*—James J. Farrell

[57] ABSTRACT

Novel block copolymers comprising from 20 to 95 mole % of monomer units derived from itaconic acid or a homologue thereof and from 5 to 80 mole % of monomer units derived from vinyl alcohol or a lower vinyl ester are excellent binders of divalent or polyvalent metals and are useful as potentially biodegradable builders in detergent compositions as well as in machine dishwashing compositions and anti-scaling rinse compositions.

11 Claims, No Drawings

COPOLYMERS AND DETERGENT COMPOSITIONS CONTAINING THEM

CROSS-REFERENCE TO RELATED APPLICATIONS

This application is a continuation-in-part of application Ser. No. 08/065,326 filed May 20th, 1993; abandoned.

TECHNICAL FIELD

The present invention is concerned with novel polycarboxylate copolymers and their use as builders in detergent compositions and rinse aid compositions for use in the final rinse step of a dish or warewashing machine.

BACKGROUND AND PRIOR ART

Polycarboxylate polymers, especially acrylic and maleic polymers, are well-known ingredients of detergent compositions and provide various benefits. They are used, for example, as antiredeposition and antiincrustation agents; for detergency building, especially in conjunction with water-insoluble aluminosilicate builders; and for the structuring of detergent powders.

Although various polycarboxylate polymers have been disclosed in the literature as detergent ingredients, only polyacrylates and acrylate/maleate copolymers have found widespread use in commercial detergent products.

Water-soluble polymers of itaconic acid and their preparation are described in U.S. Pat. No. 3,055,873 (Pfizer). These polymers are useful as antiredeposition aids in detergent compositions, and also have the capacity to form clear, extremely tough films.

U.S. Pat. No. 3,405,060 (Carter et al/Monsanto) discloses the use of water-soluble polyitaconic acid and its water-soluble salts as sequestering agents for metal cations.

The use of the water-soluble salts of itaconic acid homopolymers, and of copolymers of itaconic acid with maleic acid, acrylic acid or aconitic acid, as builders in detergent compositions, is disclosed in GB 1 054 755 (Procter & Gamble).

GB 1,530,397 and U.S. Pat. No. 4,124,748 disclose an absorbent crosslinked copolymer of an ethylenically unsaturated carboxylic acid or derivative and a vinyl ester.

EP 506 246A (Rohm & Haas), filed on 9 Mar. 1992 and published on Sep. 30, 1992, discloses the preparation of itaconic acid homopolymers and copolymers which are biodegradable and useful (inter alia) as detergent additives (antiredeposition aids) and scale inhibitors, and for the formation of clear, tough films. Low molecular weights (Mw<10,000, preferably <5,000) are preferred. The only comonomer described is acrylic acid.

EP 193 360A (Procter & Gamble) and U.S. Pat. No. 4,725,655 (BASF) disclose copolymers of a monounsaturated dicarboxylic acid (e.g., maleic or itaconic acid), a monounsaturated monocarboxylic acid (e.g., acrylic or methacrylic acid), and optionally a non-carboxylic monounsaturated monomer, for example, vinyl acetate or acrylonitrile. There is no disclosure of a copolymer containing both itaconic acid and vinyl acetate units. The Procter & Gamble document discloses a terpolymer of acrylic acid, maleic acid and vinyl alcohol (molar proportions 45/45/10).

JP 61 246 294A (Nippon Oils and Fats) discloses a liquid detergent composition with fabric softening properties, containing a polymeric acid or salt derived from acrylic, maleic or itaconic acid. The polymer may optionally contain units of a vinyl monomer, for example, ethylene, butadiene, isoprene, 2-methyl-1-butene, 1-hexene, or isobutylene.

U.S. Pat. No. 4,022,960 (Mima et al/Agency of Industrial Science and Technology) discloses copolymers of itaconic acid salts with vinyl monomers, such as methyl methacrylate, styrene and diallyl diglycol carbamate. The polymers have high refractive index and good transparency, and are useful for the moulding of optical elements such as lenses and prisms.

The literature also contains various disclosures of the polymerization of vinyl acetate with small amounts (up to 9 mole %) of itaconic acid to improve adhesion properties of the polymers. Uses for such polymers include thermal recording media, dispersing agents, and shrinkable fibers, but not detergents. The level of itaconic acid in such polymers is too low for detergency building.

For example, JP 02 163 149A (Kao) discloses a cold-water-soluble film for packaging detergents, drugs etc., the film consisting of a copolymer of 2–8 mole % itaconic acid units, 88–98 mole % vinyl alcohol units and 0–4 mole % vinyl acetate units.

U.S. 3,268,491 discloses low molecular weight of about 700 to 6,000, of $\alpha\beta$ unsaturated dicarboxylic acids with vinyl acetate, prepared by aqueous-phase copolymerization said to be useful as dispersants or surfactants.

The present invention is based on the discovery that block copolymers of itaconic acid and vinyl acetate may readily be prepared by aqueous solution radical polymerization. As such, or in hydrolyzed form, they exhibit excellent calcium binding capacity, better than that of the acrylic/maleic copolymers currently used in detergent compositions, and surprisingly under some conditions better than that of polyitaconic acid itself. Detergency evaluations have also indicated a kinetic advantage for these copolymers, so that their use is especially beneficial under energy-saving conditions (low wash temperature, short wash time). Film-forming is also better than that of polyitaconic acid. In addition, in automatic dishwashers they provide an anti-scaling and rinse aid composition.

It is also believed, and initial studies have confirmed this, that the presence of vinyl alcohol monomer blocks should facilitate biodegradation.

DEFINITION OF THE INVENTION

The present invention accordingly provides a block copolymer comprising
(i) from 20 to 95 mole % of monomer units of the formula I

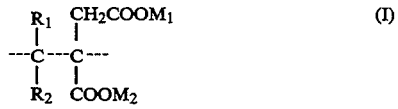

wherein each of $R_1$ and $R_2$, which may be the same or different, represents a hydrogen atom, a methyl group or an ethyl group, and each of $M_1$ and $M_2$, which may the same or different, is a hydrogen atom or a solubilizing cation; and (ii) from 5 to 80 mole % of monomer units of the formula II:

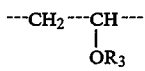
(II)

wherein $R_3$ represents a hydrogen atom or the group $-COR_4$, wherein $R_4$ is a $C_{1-4}$ alkyl group, preferably a methyl group.

The invention further provides the use of a copolymer as defined in the previous paragraph as a binder of divalent and polyvalent metals, and in particular as a detergency builder in a detergent composition.

The invention also provides a process for the preparation of a copolymer as defined in the previous paragraph, which comprises copolymerizing
(i) from 20 to 95 mole % of a compound of the formula III

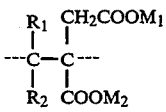
(III)

wherein $R_1$, $R_2$, $M_1$ and $M_2$ have the meanings given previously, and
(ii) from 5 to 80 mole % of a vinyl alcohol or ester of the formula IV

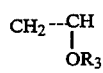
(IV)

wherein $R_3$ has the meaning given previously, and, when $R_3$ in the compound of the formula IV is an $-OR_4$ group, optionally subjecting the resulting polymeric product to hydrolysis to effect conversion of ester groups derived from the compound of the formula IV to hydroxyl groups.

DETAILED DESCRIPTION OF THE INVENTION

The Copolymer

The first subject of the invention is a novel copolymer. The polymer is characterized by the presence of monomer units (i) derived from itaconic acid or a homologue thereof, in acid or salt form, and monomer units (ii) derived from vinyl alcohol or a lower vinyl ester, preferably vinyl acetate.

The copolymer comprises from 20 to 95 mole % of units (i) and from 5 to 80 mole % of units (ii). Preferably the copolymer comprises from 30 to 95 mole % of units (i) and from 5 to 70 mole % of units (i). Most preferably the copolymer comprises from 40 to 60 mole % of units (i) and from 40 to 60 mole % of units (ii).

The number average molecular weight preferably ranges from 10,000 to 50,000, more preferably from 10,000 to 30,000.

The weight average molecular weight preferably ranges from 15,000 to 100,000, more preferably from 20,000 to 90,000.

The units (i) are derived from itaconic acid or a lower alkyl substitution product of itaconic acid.

In the formula I above, $M_1$ and $M_2$ are preferably hydrogen atoms or sodium, potassium, ammonium or lower-alkyl-substituted ammonium ions, and most preferably sodium ions.

In preferred units (i) both $R_1$ and $R_2$ represents a hydrogen atom, i.e., the units are of the formula V and are derived from itaconic acid itself or a salt thereof:

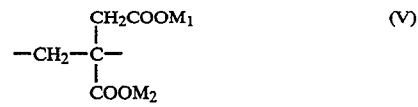
(V)

The units (ii) are derived from vinyl alcohol or a vinyl ester, preferably vinyl acetate; $R_4$ is preferably a methyl group. In the polymer, they may be present in the ester form as vinyl ester (preferably acetate) units, or in hydrolyzed form as vinyl alcohol units.

The degree of hydrolysis of the vinyl ester has little effect on the builder efficacy, but can be used to control water solubility.

Without wishing to be bound by theory, it is believed that, based on the reactivity ratio for this comonomer system, the copolymer will assume a block arrangement, being composed of relatively long blocks of itaconic acid units and relatively short blocks of vinyl ester or vinyl alcohol units.

It appears that the presence of the vinyl alcohol or vinyl ester units, incorporated in order to enhance biodegradability, unexpectedly leads also to improvements in calcium ion binding capacity and to film-forming properties.

Preparation of the Copolymers

As indicated previously, the polymers may be prepared by copolymerizing from 20 to 95 mole % of a compound of the formula III, that is to say, itaconic acid or a lower alkyl substitution product thereof in acid or salt form,

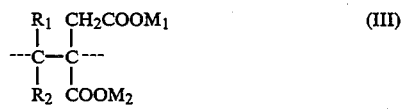
(III)

with 5 to 80 mole % of vinyl ester, preferably vinyl acetate. Optionally the ester groups may subsequently be hydrolyzed but that does not appear to be essential.

The polymerization may conveniently be carried out in aqueous or aqueous/organic solution. The preferred media are water and water/ethanol. Polymers have also been prepared successfully in dilute hydrochloric acid.

The copolymerization is advantageously conducted in the presence of a water-soluble initiator. The use of a water-soluble redox initiator is especially preferred.

Examples of suitable initiators include sodium, potassium or ammonium persulphate, 2,2'-azobis(amidinopropane) hydrochloride, 2,2'-azobis(cyanopentanoic acid); and redox initiators such as hydrogen peroxide (Fenton's reagent) and other hydroperoxide systems.

A preferred redox initiator is sodium or potassium persulphate in combination with sodium or potassium bisulphite.

The polymerization may typically be performed under a nitrogen atmosphere in a degassed solvent (preferably in water, as previously indicated) at ambient pressure, or in a sealed tube under vacuum. The itaconic acid may be in free acid or salt form.

The entire monomer charge may be polymerized in a single batch; or alternatively one or other of the reagents may be fed in incrementally as the polymerization progresses, for example, the vinyl ester may be fed gradually into the itaconic acid or itaconate salt.

The polymerization reaction proceeds steadily at temperatures of 40°–100° C.; redox initiators are generally used at relatively low temperatures, in the region of 40° C., while other initiators may require temperatures in the 50°–100° C. range. For a reasonable conversion a reaction time of 1–5 days is required, typical yields being from 20 to 83% depending on reaction time.

However, an especially preferred procedure, combines the use of itaconic acid in monosodium salt form and a specific method and order of addition: incremental addition of monosodium itaconate to vinyl ester.

Monosodium itaconate is much more water-soluble than itaconic acid and the reaction can then be carried out at higher concentrations. The monosodium itaconate is preferably added incrementally to a suspension of vinyl ester (e.g., acetate) in water, this order of addition being preferred because of the greater reactivity of the itaconate.

When this preferred method is used, high yields are obtainable in a shorter period (a few hours rather than a few days).

When the reaction is complete, a suitable solvent such as isopropanol may be added to make the system homogeneous, and hydrogen peroxide may be added to polymerize any unreacted vinyl acetate.

Binding of Divalent and Polyvalent Metals

A further subject of the invention is the use of the copolymers defined above to bind divalent and polyvalent metals, especially to bind calcium and magnesium ions in aqueous media.

Copolymers of the invention display calcium binding capacity substantially superior to that of sodium tripolyphosphate, one of the recognized benchmarks in this area especially in the detergents art; and superior also to that of acrylic/maleic copolymers which are commonly used in current detergent products.

It has also been found, surprisingly, that at high calcium ion concentrations the calcium binding capacity of the copolymers is greater than that of polyitaconic acid, and the rate of calcium ion concentration lowering is slightly greater than that of polyitaconic acid.

In detergent compositions, the polymers of the invention have been found to give comparable or slightly better detergency building under equilibrium conditions (a relatively long wash time and/or high temperature), and significantly better detergency building under usage conditions of short wash time and low temperature. This kinetic advantage makes the polymers especially suitable for incorporation in detergent compositions intended for use under such conditions.

However, the copolymers of the invention are highly useful as builders in detergent compositions of all types.

Detergent Compositions

The novel detergency builders of the present invention may be incorporated in detergent compositions of all physical types, for example, powders, liquids, gels, and solid bars. They may if desired be used in conjunction with other detergency builders.

The total amount of detergency builder in the compositions will suitably range from 15 to 80 wt %, and this may be constituted wholly or partially by the copolymeric materials of the invention. The amount of copolymer in the detergent composition may range, for example, from 1 to 80 wt %.

The copolymeric builder of the invention may advantageously be used in conjunction with an inorganic builder. Suitable inorganic builders include sodium carbonate, if desired, in combination with a crystallization seed for calcium carbonate, as disclosed in GB 1 437 950 (Unilever); crystalline and amorphous aluminosilicates, for example; zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Henkel); maximum aluminum zeolite P (zeolite MAP) as described and claimed in EP 384 070A (Unilever); and layered silicates as disclosed in EP 164 514B (Hoechst).

Inorganic phosphate builders, for example, sodium orthophosphate, pyrophosphate and tripolyphosphate, may also be present, but the invention is of particular applicability to compositions containing reduced or zero levels of inorganic phosphate.

Organic builders that may be present include polymeric polycarboxylates such as those described and claimed in EP 435 505A and EP 433 010A (Unilever) as well as unmodified polyacrylates and acrylic/maleic copolymers; monomeric polycarboxylates such as citrates, gluconates, oxydisuccinates, tartrate monosuccinates and disuccinates, glycerol mono-, di- and trisuccinates, carboxymethyloxysuccinates, carboxymethyloxymalonates, dipicolinates, hydroxyethyliminodiacetates, nitrilotriacetates, ethylenediaminetetraacetates, alkyl and alkenyl malonates and succinates, and sulphonated fatty acid salts. This list is not intended to be exhaustive.

A preferred builder system comprises crystalline aluminosilicate in combination with a copolymer of the present invention. The aluminosilicate is preferably selected from zeolite A, maximum aluminum zeolite P (zeolite MAP) as described and claimed in EP 384 070A (Unilever), and mixtures of these. Zeolite MAP is zeolite P having a silicon to aluminum ratio not exceeding 1.33, preferably not exceeding 1.15, and most preferably not exceeding 1.07.

Detergent compositions of the invention will also contain, as essential ingredients, one or more detergent-active compounds which may be chosen from soap and non-soap anionic, cationic, nonionic, amphoteric and zwitterionic detergent-active compounds, and mixtures thereof. The amount of detergent-active compound present is suitably within the range of from 0.5 to 60 wt %.

Many suitable detergent-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and nonionic compounds.

Anionic surfactants are well known to those skilled in the art. Examples include alkylbenzene sulphonates, particularly sodium linear alkylbenzene sulphonates having an alkyl chain length of $C_8$–$C_{15}$; primary and secondary alkyl sulphates, particularly sodium $C_{12}$–$C_{15}$ primary alcohol sulphates; alkyl ether sulphates; olefin sulphonates; alkane sulphonates; alkyl xylene sulphonates; dialkyl sulphosuccinates; and fatty acid ester sulphonates.

Nonionic surfactants that may be used include the primary and secondary $C_{8-18}$ alcohol ethoxylates, especially the $C_{12}$–$C_{15}$ primary and secondary alcohols, ethoxylated with an average of from 3 to 20 moles of ethylene oxide per mole of alcohol; alkylpolyglycosides; and polyhydroxyamides.

The choice of surfactant, and the amount present, will depend on the intended use of the detergent composition. For example, for machine dishwashing a relatively low level of a low-foaming nonionic surfactant is generally preferred. In fabric washing compositions, different surfactant systems may be chosen, as is well known by the skilled detergent formulator, for handwashing products and for machine washing products.

The total amount of surfactant present will of course depend on the intended end use and may be as low as 0.5% by weight, for example in a machine dishwashing composition, or as high as 60% by weight, for example in a composition for washing fabrics by hand. For fabric washing compositions in general, an amount of from 5 to 40% by weight is generally appropriate.

Detergent compositions suitable for use in most automatic fabric washing machines generally contain anionic non-soap surfactant, or nonionic surfactant, or combinations of the two in any ratio, optionally together with soap.

An especially preferred particulate detergent composition for high performance fabric washing comprises
(a) from 15 to 50 wt % of a surfactant system consisting essentially of:
  (a1) nonionic surfactant which is an ethoxylated primary $C_8$–$C_{18}$ alcohol, preferably having an average degree of ethoxylation not exceeding 6.5 (from 60 to 100 wt % of the surfactant system), and
  (a2) primary $C_8$–$C_{18}$ alkyl sulphate (from 0 to 40 wt % of the surfactant system);
(b) from 20 to 80 wt % of detergency builder comprising:
  (b1) a crystalline aluminosilicate, and
  (b2) a copolymer according to the present invention;
(c) optionally other detergent ingredients to 100 wt %.

The aluminosilicate is preferably zeolite A, zeolite MAP or a mixture of the two.

Detergent compositions according to the invention may also suitably contain a bleach system. Machine dishwashing compositions may suitably contain a chlorine bleach, while fabric washing compositions may contain peroxy bleach compounds, for example, inorganic persalts or organic peroxyacids, which may be employed in conjunction with activators to improve bleaching action at low wash temperatures.

Preferred inorganic persalts for inclusion in fabric washing compositions are sodium perborate monohydrate and tetrahydrate, and sodium percarbonate, advantageously employed together with an activator. Bleach activators, also referred to as bleach precursors, have been widely disclosed in the art. Preferred examples include peracetic acid precursors, for example, tetraacetylethylene diamine, now in widespread commercial use in conjunction with sodium perborate; and perbenzoic acid precursors. The novel quaternary ammonium and phosphonium bleach activators disclosed in U.S. Pat. No. 4,751,015 and U.S. Pat. No. 4,818,426 (Lever Brothers Company) are also of great interest.

Other materials that may be present in detergent compositions of the invention include sodium silicate, fluorescers, antiredeposition agents, inorganic salts such as sodium sulphate, enzymes, lather control agents or lather boosters as appropriate, pigments, and perfumes. This list is not intended to be exhaustive.

Detergent compositions of the invention may be prepared by any suitable method. Detergent powders are suitably prepared by spray-drying a slurry of compatible heat-insensitive components, and then spraying on or postdosing those ingredients unsuitable for processing via the slurry. The skilled detergent formulator will have no difficulty in deciding which components should be included in the slurry and which should be postdosed or sprayed on. The polymeric builder material of the invention may generally be included in the slurry if desired, although other methods of incorporation may of course be used if desired.

Film Forming Properties

The copolymers of the invention also display excellent film-forming properties.

This makes them especially useful in detergent compositions in powder form, where powder structuring is directly related to film-forming ability.

A further use for the copolymers of the invention in the detergents field is as a substrate material for water-soluble detergent or wash additive sachets. Sachets having walls composed of these materials will dissolve readily in the wash liquor, and the dissolved copolymer can then perform as a detergency builder.

It has been found that films prepared from the copolymers of the invention have superior flexibility and shorter dissolution times than do films derived from itaconate homopolymers.

In yet another embodiment, the lower molecular weight copolymers can be used as anti-scalant in the final rinse in mechanical dishwashers.

Machine dishwashing compositions usually contain as main components a builder or builder mixture, buffering and/or alkaline agents, and optionally a surfactant, a bleaching agent which may be a chlorine or oxygen bleach, and lately often also enzymes (e.g., protease, amylase, cellulase, lipases and mixtures thereof). Rinse aid compositions usually comprise an aqueous liquid containing as major components a low foaming nonionic surfactant and an organic chelating agent e.g., citric acid.

It is known that high concentrations of carbonic species during the main wash cycle and final rinse in a dishwasher can lead to the formation of calcium carbonate deposits (scaling) on the washed articles, visible particularly on glasses as white deposit, and also on machine parts, especially the heater elements. Tap water of a relatively high water hardness and insufficient softening in the machine increase the problem dramatically. Other parameters involved in the scaling process are temperature (high temperature increases deposition) and pH (higher pH appears to increase scaling). This phenomenon can occur with any machine dishwashing product formulations although to a much lesser extent with conventional products based on the highly effective sodium triphosphate builder. In the last few years, however, machine dishwashing products manufacturers have gradually changed over to low phosphate, non-phosphate and even zero-P product formulations. These products have currently become an important part of machine dishwashing products on the market. Because non-phosphate and zero-P formulations inherently contain less effective builders as phosphate replacements, e.g., citrates, carbonates, zeolites, which also have inadequate scale inhibiting properties, the risk of scaling with these products is higher than with the conventional sodium triphosphate products.

Scale formations on dishes and machine parts is thus an important problem that needs to be resolved or at least mitigated in formulating a machine dishwashing product, especially in the case of low phosphate (e.g., less than the equivalent of 20% by weight, particularly 10% by weight of sodium triphosphate) and phosphate-free machine dishwashing compositions, particularly zero-P machine dishwashing compositions.

In order to reduce this problem, co-builders, such as polyacrylic acids or polyacrylates (PAA); maleic anhydride/(meth)acrylic acid copolymers e.g., Sokalan CP5 ® ex BASF; and the various organic polyphosphonates, e.g., of the Dequest ® range, have been added to phosphate-free machine dishwashing compositions. A drawback of these polymers is that they are not sufficiently biodegradable and therefore, environmentally less acceptable. The polyphosphonates whilst being effective are less acceptable as being P-containing products. It has furthermore been observed that, especially when phosphate-free machine dishwashing compositions containing such co-builders are used as main wash product in machine dishwashing operations, the visual appearance of articles, especially glasses, often deteriorates after a plurality of washings, despite the use of rinse aids.

The low molecular weight copolymers of this invention are usable to reduce scale in mechanical dishwashers and are non-phosphorus containing compounds and are fully biodegradable. They have a weight average molecular weight preferably ranging from 1,000 to 60,000, more preferably from 1,500 to 50,000, and most preferably from 2,000 to 40,000.

The block copolymer as defined above can be used as an effective anti-scaling agent in machine dishwashing compositions or in rinse aid compositions to inhibit calcium carbonate scale formation on washed articles and machine parts while eliminating many of the drawbacks of anti-scalants of the art.

Accordingly, in another embodiment of the invention provides a machine dishwashing composition comprising a builder and an anti-scalant, characterized in that the anti-scalant comprises an effective level of a block copolymer ITA/VA as defined above.

In another aspect, the invention provides a rinse aid composition, suitable for use in an aqueous rinse liquor in the rinse step of a machine dishwashing operation, characterized in that the composition comprises a block copolymer ITA/VA as defined above.

The weight average molecular weight preferably ranges from 1,000 to not more than 60,000. Copolymers of molecular weight higher than 60,000 are excellent builders, but ineffective as anti-scalants. Preferred copolymers are therefore those having weight average molecular weight of not more than 50,000, preferably not more than 40,000. Preferred weight average molecular weight (Mw) ranges are from 1,500 to 50,000, particularly from 2,000 to 40,000.

Within these ranges it applies as a rule that the higher the molecular weight, the higher the mole % of vinyl acetate is required.

Examples of preferred copolymers are copolymers of itaconic acid and vinyl acetate of the following compositions and Molecular Weights (Mw).

| ITA/VA mole ratio | Mw |
|---|---|
| 20/80 | 29,000 |
| 50/50 | 5,300 |
| 70/30 | 20,500 |

The copolymer may also be a terpolymer of monomer units (i) and (ii), such as for example, a terpolymer containing vinyl acetate (48 mole %), disodium itaconate (48 mole %), and mono-lauryl itaconate (4 mole %), having Mw 15,200.

Effectively, the level of the block copolymer ITA/VA to be included in the machine dishwashing composition or the rinse aid composition or in both may range from about 0.1% to about 15% by weight, preferably from 0.25% to about 10%, particularly from 0.5% to 10% by weight of the composition. Usually an amount of not more than 5% by weight of the composition will be sufficient.

The machine dishwashing composition of the invention will normally also contain a builder or builder mixture, buffering and/or alkaline agents, optionally, but preferably, also a bleaching agent and an enzyme or mixtures of enzymes.

Builder Material

Generally, the same builders that may be used with detergent compositions may be also used with machine dishwashing compositions. They may be present from about 90% to about 10% of the composition by weight, preferably 20% to 80% by weight.

Particularly preferred builders are citrates, DPA, ODS, alkenylsuccinates, carbonates, bicarbonates, and also the higher molecular weight block copolymers ITA/VA having Mw greater than 60,000.

Accordingly, in one specific embodiment the invention provides a machine dishwashing composition comprising as builder a block copolymer ITA/VA having Mw > 60,000 and as anti-scalant a block copolymer ITA/VA of Mw < 60,000 as hereinbefore described.

The Buffering and/or Alkaline Agent

This is normally an alkalimetal silicate, preferably sodium silicate at a level of from about 1 to about 70% by weight, preferably from 5% to 40% by weight. This material is employed as a cleaning ingredient, source of alkalinity, metal corrosion inhibitor and protector of glaze on china tableware. Especially effective is sodium silicate having a mole ratio of $SiO_2:Na_2O$ of from about 1.0 to about 3.3., preferably from about 1.8 to about 2.2, normally referred to as sodium disilicate.

NaOH and/or KOH are also commonly used to provide alkalinity in compositions for industrial warewashing machines.

The Bleaching Agent

If present, the amount of bleaching agent will preferably lie in a range from 1% to 30% by weight. Alkali metal hypochlorite may be incorporated. Other chlorine bleaches are alkali metal salts of di- and tri-chloro and di- and tri-bromo cyanuric acids.

Preferred bleaches are the peroxygen bleaches, such as sodium perborate (tetra- or monohydrate) or sodium percarbonate. These are preferably used in conjunction with a bleach activator which allows the liberation of active oxygen species at a lower temperature. Numerous examples of activators of this type, often also referred to as bleach or peracid precursors, are known in the art. Preferred bleach activators are tetraacetyl ethylene diamine (TAED), glucose pentaacetate (GPA)

and the mono-long chain acyl tetraacetyl glucoses as disclosed in WO 91/10719, but other activators such as choline sulphophenylcarbonate (CSPC) as disclosed in U.S. Pat. Nos. 4,751,015 and 4,818,426 can be used. The amounts of sodium perborate or percarbonate and bleach activator in the compositions preferably do not exceed 20% and 10% by weight respectively, e.g., from 4%–20% and from 2%–10% by weight respectively.

Another peroxygen bleach is potassium monopersulphate. Further, peroxygen bleaches which may be used are the organic peroxyacids and their metal salts. Typical peroxy-acids include:

(i) peroxybenzoic acid and ring-substituted peroxybenzoic acids, e.g., peroxy-α-naphthoic acid;

(ii) aliphatic and substituted aliphatic monoperoxy acids, e.g., peroxylauric acid and peroxystearic acid;

(iii) 1,12-diperoxydodecanedioic acid (DPDA);

(iv) 1,9-diperoxyazelaic acid;

(v) diperoxybrassylic acid; diperoxysebacic acid and diperoxyisophthalic acid;

(vi) 2-decyldiperoxybutane-1,4-dioic acid; and (vii) phthaloylamido peroxycaproic acid (PAP)

Instead of or together with said bleach activators, a bleach catalyst, such as the manganese complexes of EP-A-458,397 and the sulphonimines of U.S. Pat. Nos. 5,041,232 and 5,047,163 may also be added.

Enzymes

Amylolytic and/or proteolytic enzymes are normally used. The amylolytic enzymes usable herein can be those derived from bacteria or fungi. Preferred amylolytic enzymes are those prepared and described in GB Patent NO. 1,296,839, cultivated from the strains of *Bacillus licheniformis* NCIB 8061, NCIB 8059, ATCC 6334, ATCC 6598, ATCC 11945, ATCC 8480 and ATCC 9945 A. Examples of such amylolytic enzymes are those produced and distributed under the Tradenames of SP-95 ® and Termamyl ® by Nobo Industri A/S, Copenhagen, Denmark. These amylolytic enzymes are generally presented as granules and may have enzyme activities of from about 2 to 10 Maltose units/milligram. They ,may be present in the composition of the invention in amounts such that the final composition has amylolytic enzyme activity of from 103 to 106 Maltose Units/Kilogram.

The amylolytic activity as referred to herein can be determined by the method as described by P. Bernfeld in "*Method of Enzymology*", Volume I, (1955), page 149.

The proeolytic enzymes usable herein are, for example, the subtilisins which are obtained from particular strains of *B. Subtilis* and *B. licheniformis*, such as the commercially available substilisins Maxatase ® supplied by Gist-Brocades NV, Delft, Holland and Alcalase ®, supplied by NOVO Industri A/S Copenhagen, Denmark. Particularly suitable are proteases obtained from a strain of Bacillus having maximum activity throughout the pH range of 8–12, being commercially available from NOVO Industri A/S under the tradenames of Esperase ® and Savinase ®. The preparation of these and analogues enzymes is described in GB Patent No. 1,243,784. These enzymes are generally presented as granules, e.g., marumes, prills, T-granulates, etc., and may have enzyme activities of from 500 to 1,700 Glycine Units/mg. The proteolytic enzyme activity can be determined by the method as described by M. L. Anson in "Journal of General Physiology", Vol. 22 (1938), page 79 (one Anson unit/gram=733 Glycine Units/milligram).

In the compositions of the invention, proteolytic enzymes may be present in amounts such that the final composition has proteolytic enzyme activity of from about $10^6$ to $10^8$ Glycine Units/Kilogram.

Other enzymes, such as lipolytic enzymes may also be incorporated to improve fat removal. Typical examples of commercial lipolytic enzymes are Lipase YL, Amano CE, Wallerstein AW, Lipase My, and Lipolase ex Novo Ind.

Other Optional Ingredients

Surfactants though not strictly essential may also be present for detergency, soil removal, foam depression and/or as rinse aids. If present, they can be used in an amount of up to about 60% by weight depending upon their type and properties. Normally in a properly built or highly built composition as is conventional, only small amounts of low- to non-foaming nonionic surfactant in the order of 0.1–5% by weight are used, preferably from 0.1–4%, to aid detergency and particularly to suppress excessive foaming caused by some protein soil. Higher amounts, i.e., 5–60% by weight of highly detersive surfactants, such as the high HLB nonionic surfactants, the anionic sulphate or sulphonate surfactants and the alkyl polyglycoside class of surfactants, may be used in lower builder containing active/enzyme-based compositions. In the context of the present invention, a surfactant content from 0 to less than 5% by weight is preferred.

Other optional ingredients that can be further included in minor amounts are clay minerals, particularly the layered clay minerals to reduce film- and spot formation on washed articles. Typical and particularly preferred commercial clay products are the synthetic hectorites manufactured and supplied by Laporte Industries Ltd., England as Laponite ® clays, e.g., Laponite S, Laponite XLS, Laponite RD and Laponite RDS.

Other materials usable herein for this purpose are hydrotalcite compounds, especially Zn/Al hydrotalcite, as described in Applicant's co-pending European Application No. 92307241.7.

Zinc salts, both soluble and insoluble zinc salts, can also be incorporated as adjuncts for minimizing glass corrosion.

An inert particulate filler especially sodium sulphate may also be incorporated, though in compact powdered composition it should desirably be omitted as practically possible.

The products of the present invention can be manufactured and presented in any physical form such as a powder, liquid, paste or solid blocks or tablets, and are preferably formulated such that they provide a wash liquor with a pH of between 6 and 13, preferably from 8 to 11, and more preferably from 9.0 to 10.5 (measured at a concentration of from 0.1 to 0.3% by weight in water).

As explained, the invention is also applicable to conventional rinse aid compositions, which usually comprise an aqueous solution comprising a low-foaming nonionic surfactant, citric acid or sodium citrate and optionally a hydrotrope such as a lower alcohol or sodium xylene sulphonate.

The copolymer ITA/VA according to the invention may be added to the rinse water as such, or it may be added thereto in the form of a liquid solution in water, or in the form of a composition in any suitable physical form comprising the polymer and other suitable or desirable ingredients as normally used in rinse aid products. Such other suitable ingredients may be low levels of wetting or detergent surfactants; organic acids such as citric acid; hydrotropes; alcohols; perfumes; germicides; anti-corrosion agents; clays, particularly layered clay minerals such as the Laponite ® clays supplied by Laponite Ind. Ltd. etc. Suitable physical forms are powders, liquids, tablets, blocks, granulates, etc. Liquid is, however, a suitable preferred form.

To be effective, the level of the polymer in the rinse liquor may vary, depending upon whether the main wash composition already contains the anti-scalant polymer or not. As a rule, the rinse liquor may contain the defined polymer in concentrations of from 0.2 ppm to about 30 ppm, preferably from 0.5 ppm, to 20 ppm, with about 1 to 10 ppm being the optimum. These correspond to a level of about 0.1% to about 15%, preferably from 0.25% to 10%, and from 0.5% to 5% by weight as optimum in rinse aid compositions normally used at a dosage level of about 1–3 ml in 6 liters of rinse water.

Accordingly, in one more aspect, the invention provides a process for warewashing in a dishwashing machine comprising washing the articles in a main wash cycle and rinsing them in a rinse cycle, characterized in that in the rinse step there is added to the rinse water a copolymer ITA/VA as hereinbefore defined in an amount such that the rinse liquor contains the defined polymer in a concentration of from 1 ppm to about 20 ppm, preferably from 5 ppm to 15 ppm.

The invention will now be further illustrated by way of the following non-limiting Examples.

EXAMPLES

Characterization of the Polymers

The polymers were characterized by infrared spectrometry and in some cases by nuclear magnetic resonance spectroscopy.

The infrared instrumentation used included the Nicolet ® 1705X Fourier Transform infrared spectrometer with MCT detector using the Nicolet 1280 processor, and the Nicolet SDXC Fourier Transform infrared spectrometer with DGS detector using the Nicolet 62 processor.

$^1H$ and $^{13}C$ NMR spectra were run on a Brucker ® WM 360 MHz Fourier Transform spectrometer.

Number-average and weight-average molecular weights of polymeric materials were determined by gel permeation chromatography. This was carried out using a Hewlett Packard ® HP 1090 liquid chromatograph fitted with a 30 cm×7.5 cm TSK gel linear GMPW column. Organic-solvent-soluble polymers were measured against polystyrene standards, and water-soluble polymers against polyethylene glycol.

Calcium Binding

The calcium binding properties of the polymers were measured by titration of the samples with a calcium chloride solution using a calcium-ion-selective electrode of the type Radiometer ® F2112Ca. The calcium binding constant $pK_{ca}2+$ was calculated by the method of C Tanford in Chapter 8, Multiple Equilibria, Physical Chemistry of Macromolecules, John Wiley, New York, 1961.

Values of $pK_{ca}2+$ of 4.0 or above represent materials likely to be useful as detergency builders, either alone or in conjunction with other builder materials. The value for sodium tripolyphosphate is 6.0, and any figure higher than this indicates excellent building.

Biodegradability

This was investigated by means of the following tests as described in the OECD Guidelines.
(a) Modified SCAS test as described in OECD Guideline 302a. This test measures removal of test material by dissolved organic carbon analysis. It is believed that an 80% removal is a reasonable indication of biodegradability or adsorption.
(b) Modified Sturm test as described in OECD guideline 302b. This test measures $CO_2$ production from the test material under standard condition. A 60% conversion to $CO_2$ in the Sturm test is an indication of ready biodegradability.

EXAMPLES 1 TO 13: PREPARATION OF COPOLYMERS

Examples 1 and 2

Preparation of poly(vinyl alcohol co-itaconate)

This Example describes the preparation of two copolymers of differing molecular weights, each from 50 mole % vinyl acetate and 50 mole % itaconic acid.

These polymers have the formula VI:

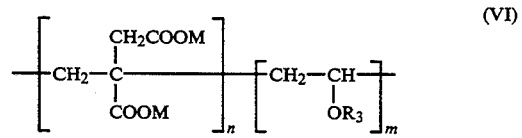

(VI)

wherein $R_3$ indicates hydrogen (predominant) or an acetyl group, and the indices n and m indicate the numbers of repeating units.

Preparation of the Copolymer Of Example 1

Vinyl acetate (23.4 ml, 0.25 mole), itaconic acid (30 g, 0.25 mol) and degassed water (200 ml) were charged into a flange flask and stirred at 40° C. under a nitrogen atmosphere. The redox initiator, comprising sodium persulphate (0.8 g) and sodium metabisulphite (0.4 g), was added in increments each of 0.3 g over four days. The polymer-containing solution was concentrated to approximately half volume using a rotary evaporator and the concentrate poured into acetone. This precipitated the polymer which was washed with portions of acetone. The copolymer was then vacuum dried.

The copolymer was then neutralized and hydrolyzed with sodium hydroxide (5.4 g, 1.35 mol) in hot water (50 ml). The sodium salt of the hydrolyzed copolymer was precipitated into a large excess of ethanol (300 ml). After separation and removal of ethanol, the copolymer was dissolved in water, and freeze dried. The yield was 17.3 g (32%).

Preparation of the Copolymer of Example 2

The copolymer of Example 2 was prepared by a similar method, but using sodium persulphate alone as the initiator. The reaction temperature was 60° C. The yield was 25.8 g (48%).

Characterization (i) Fourier transform infrared spectrum (KBr wafer)
    Short-chain polycarboxylate (C=O stretch) 1580 $cm^{-1}$
(ii) $^1H$ NMR (deuterium oxide)

Chemical shifts (ppm): 1.6–3.3 backbone protons (CH$_2$ and CH)

(iii) Aqueous GPC molecular weights

|  | M$_n$ | M$_w$ | D |
|---|---|---|---|
| Example 1 | 18 000 | 31 500 | 1.7 |
| Example 2 | 20 000 | 34 900 | 1.7 |

(iv) Calcium binding constants

|  | pK$_{ca}$2 + |
|---|---|
| Example 1 | 8.27 |
| Example 2 | 8.89 |

(v) Biodegradation

The modified SCAS test for the polymer of Example 1 showed 93.3% removal, indicating virtually complete biodegradation.

EXAMPLES 3 AND 4

Preparation of poly(vinyl acetate co-itaconate)

This Example relates to two copolymers of the formula V shown previously, but wherein R$_3$ indicates an acetyl group.

Preparation of the Copolymer of Example 3

A copolymer was prepared by a method similar to that described in Examples 1 and 2, except that the vinyl acetate was added to the itaconate charge incrementally over 3 hours, and the hydrolysis step was omitted. The yield was 47%.

Preparation of the Copolymer of Example 4

A copolymer was prepared by a similar method, but in 50/50 ethanol/water instead of water. The initiator was sodium persulphate, added incrementally with vinyl acetate at 60° C. The yield was 73%.

Characterization

The polymers were characterized, as described in Examples 1 and 2, by Fourier transform IR, $^1$H NMR, and GPC Molecular weight and calcium binding data were as follows:

| Example | M$_n$ | M$_w$ | D | pK$_{ca}$2 + |
|---|---|---|---|---|
| 3 | 19,500 | 36,900 | 1.9 | 8.47 |
| 4 | 10,500 | 31,700 | 3.0 | 7.21 |

EXAMPLES 5 TO 8

Polymerization in Dilute Hydrochloric Acid

Four further copolymers were prepared from a monomer mixture comprising 50 mole % of itaconic acid and 50 mole % of vinyl acetate, but using dilute hydrochloric acid as polymerization medium.

Preparation of the Copolymers of Examples 5 and 6

Itaconic acid (22.7 g, 0.174 mol) and vinyl acetate (15.0 g, 0.174 mol) were stirred with degassed 0.1M hydrochloric acid (80 ml) at 40° C. Sodium persulphate (0.5 g) with sodium metabisulphite (0.25 g) was added in four portions over a period of 48 hours. The resulting copolymer was isolated by precipitation into acetone. It was then purified further by two more precipitations into acetone from concentrated aqueous solutions.

To obtain the disodium salt, the copolymer was then dissolved in water, neutralized with 6% sodium hydroxide solution to pH 8.5, and then freeze-dried. The yields were 10.3 g (29%) and 7.6 g (24%) respectively.

Preparation of the Copolymer of Example 7

The copolymer of Example 7 was prepared by a method similar to that described above, except that the vinyl acetate was fed to the itaconic acid over a period of approximately 4 hours. Preparation of the Copolymer of Example 8

The copolymer of Example 8 was prepared by a method similar to that described in Examples 5 and 6 above, but using sodium persulphate alone as initiator, and 0.5M hydrochloric acid as polymerization medium.

Characterization

The polymers were characterized as described in previous Examples. Molecular weights and calcium binding constants were as follows:

| Example | M$_n$ | M$_w$ | D | pK$_{ca}$2 + |
|---|---|---|---|---|
| 5 | 24,300 | 64,300 | 2.7 | 9.60 |
| 6 | 46,000 | 77,800 | 3.0 | 8.96 |
| 7 | 18,000 | 62,500 | 3.3 | 7.50 |
| 8 | 3,000 | 5,300 | 1.8 | 6.58 |

EXAMPLES 9 TO 13

Preparation of polymers having different monomer ratios

Four copolymers (Examples 9 to 12) having different ratios of itaconic acid to vinyl acetate were prepared by the method (in water/ethanol) described in Examples 1 and 2.

A further copolymer (Example 13) having the same monomer ratio as that of Example 12 (95 mole % itaconic acid, 5 mole % vinyl acetate) was prepared by the method (in dilute hydrochloric acid) described in Examples 5 and 6. The yield was 14 g (35%).

Monomer ratios, molecular weights and calcium binding constants were as follows: (i) indicates itaconic acid, and (ii) indicates vinyl acetate.

|  | (i) | (ii) | M$_n$ | M$_w$ | D | pK$_{ca}$2 + |
|---|---|---|---|---|---|---|
| 9 | 60 | 40 | 20,800 | 49,600 | 2.4 | 8.61 |
| 10 | 70 | 30 | 8,600 | 20,500 | 2.4 | 6.29 |
| 11 | 80 | 20 | 3,000 | 81,800 | 27.5 | 6.74 |
| 12 | 95 | 5 | 10,400 | 24,800 | 2.4 | 8.50 |
| 13 | 95 | 5 | 27,100 | 88,900 | 3.3 | 9.20 |

EXAMPLES 14 AND 15

Preparation of 50/50 itaconic acid/vinyl acetate copolymer by improved method

In these Examples, the improved method using incremental addition of monosodium itaconate to vinyl acetate was used.

EXAMPLE 14

The reaction was conducted at a reactant concentration of approximately 30 wt %. The reagents were as follows:

| | | |
|---|---|---|
| Itaconic acid | 60.0 g | 0.46 mole |
| Vinyl acetate | 39.6 g | 0.46 mole |
| Sodium persulphate | 10.0 g | |
| Sodium hydroxide | 18.4 g | 0.46 mole |
| Deionized water | 265 ml | |

The sodium hydroxide was dissolved in deionized water (75 ml). To this solution was added the itaconic acid with stirring and cooling. The resulting solution of monosodium itaconate was transferred to a pressure equalizing dropping funnel. Vinyl acetate was weighed into a 1-liter flange reactor, together with deionized water (150 ml). Sodium persulphate initiator was dissolved in deionized water (40 ml) in a separate dropping funnel.

The vinyl acetate/water suspension was stirred at 60° C. under nitrogen and about one tenth of the initiator solution added, and then immediately dropwise addition of the itaconate solution and the remainder of the initiator was commenced. The additions took place over a total period of 2 hours, and the reaction mixture was then stirred for a further 4 hours.

Isopropanol (50 ml) was then added to homogenize the mixture, and after 10 minutes' stirring hydrogen peroxide (0.5 ml of 27.5 wt % aqueous solution) was added. Stirring was continued for a further 20 minutes, and the reactor then cooled.

The polymerization liquor was concentrated using a rotary evaporator to remove free vinyl acetate, then diluted with water and fully neutralized to pH 9 with sodium hydroxide. The copolymer disodium salt was recovered by freeze drying. The yield was 110 g: 83% conversion based on $^1$H NMR.

The copolymer contained 5-10 mole % of free disodium itaconate. This could easily have been removed, for example, by precipitation/solvent extraction, but in order to simulate a large-scale commercialized production method, no measures were taken to remove unpolymerized itaconate.

EXAMPLE 15

The procedure of Example 14 was followed, but this time at a reactant concentration of approximately 15 wt %.

The molecular weights and calcium binding constant were as follows:

| Example | $M_n$ | $M_w$ | D | $pK_{ca}2+$ |
|---|---|---|---|---|
| 14 | 3,300 | 11,000 | 3.3 | 7.2 |
| 15 | 4,700 | 11,400 | 2.43 | 7.2 |

EXAMPLES 16 TO 20: DETERGENCY EVALUATIONS

In these experiments, the copolymer of Example 5 was compared with the commercial acrylic/maleic copolymer, Sokalan® CP5, in various detergent formulations.

The measurements were carried out in the tergotometer using water of 30° French hardness (equivalent to $3 \times 10-3$ mole/liter Ca2+), 0.5 liters of wash liquor, and an agitation rate of 60 reciprocations per minute.

In each wash, four cotton test cloths (each 7.63 cm square) carrying builder-sensitive model clay soil were used. Two replicate runs of each formulation were performed. After the wash was complete, the test cloths were rinsed twice in 30° FH. water and dried. Reflectance at 460 nm was measured before and after the wash.

The following abbreviations are used below:

| | |
|---|---|
| cocoPAS | coconut alcohol sulphate, sodium salt |
| LAS | linear alkylbenzene sulphonate |
| NI E7 | $C_{12-15}$ primary alcohol 7EO ethoxylate |
| NI E3 | $C_{12-15}$ primary alcohol 3EO ethoxylate |
| Silicate | sodium silicate |
| Carbonate | sodium carbonate |
| Perborate | sodium perboate monohydrate |
| Zeolite 4A | zeolite A: Wessalith (Trade Mark) P ex Degussa |
| Zeolite MAP | maximum aluminum zeolite P as described and claimed in EP 384 070A (Unilever), silicon to aluminum ratio 1.0. |

EXAMPLES 16 TO 19

Comparative Examples A to D Detergency values under equilibrium conditions

Wash liquors were prepared for tergotometer testing as described above. The wash liquors contained the ingredients listed below (in parts by weight), in amounts corresponding to a notional total "product" (=100 parts by weight) dosage of 5 g/liter.

| Example | 16,A | 17,B | 18,C | 19,D |
|---|---|---|---|---|
| CocoPAS | 5.2 | — | 5.2 | — |
| LAS | — | 12.0 | — | 12.0 |
| NI 7EO | 5.2 | 5.0 | 5.2 | 5.0 |
| NI 3EO | 6.6 | — | 6.6 | — |
| Zeolite 4A | 28.0 | 28.0 | — | — |
| Zeolite MAP | — | — | 28.0 | 28.0 |
| Polymer | 8.0 | 8.0 | 8.0 | 8.0 |
| Silicate | 4.5 | 4.5 | 4.5 | 4.5 |
| Carbonate | 8.0 | 8.0 | 8.0 | 8.0 |
| Perborate | 15.0 | 15.0 | 15.0 | 15.0 |
| | 80.5 | 80.5 | 80.5 | 80.5 |

The weights of the two zeolites are given on an anhydrous basis. Hydrated zeolite 4A is 78 wt % active, while hydrated zeolite MAP is 80 wt % active.

The polymer used in Examples 16 to 19 was the 50/50 PVA/itaconate polymer of Example 5, while in Comparative Examples A to D the polymer was Sokalan CP5 acrylate/maleate copolymer. Thus each polymer was evaluated in detergent compositions containing two different surfactant systems, and two different builders.

The wash temperature was 40° C. and the wash time was 30 minutes. Detergency results were as follows:

| Example | Reflectance increase at 460 nm |
|---|---|
| 16 | 27.71 + 0.03 |
| A | 27.64 + 0.18 |
| 17 | 26.65 + 0.18 |
| B | 26.30 + 0.40 |
| 18 | 27.08 + 0.23 |
| C | 27.49 + 0.02 |
| 19 | 26.74 + 0.40 |
| D | 27.24 + 0.48 |

No significant differences were observed between the systems containing the polymers of the invention and those containing the acrylic/maleic copolymer, indicating that under equilibrium conditions (relatively long wash time and relatively high temperature) parity of performance with existing products could be obtained using the polymers of the invention.

EXAMPLE 20

Comparative Example E: time-dependent measurements

A further series of comparisons was carried out, using shorter wash times and a lower wash temperature (20° C.). The wash liquor formulations used and detergency results obtained are shown below.

| Formulations (parts by weight) | 20 | E |
|---|---|---|
| CocoPAS | 1.3 | 1.3 |
| NI 7EO | 1.3 | 1.3 |
| NI 3EO | 1.65 | 1.65 |
| Zeolite 4A | 28.0 | 28.0 |
| Copolymer of Example 5 | 8.0 | — |
| Acrylate/maleate copolymer | — | 8.0 |
| Silicate | 4.5 | 4.5 |
| Carbonate | 8.0 | 8.0 |
| Perborate | 15.0 | 15.0 |
|  | 67.75 | 67.75 |

| DETERGENCY RESULTS | | |
|---|---|---|
| | Reflectance Increase of 460 nm | |
| Wash Time (min) | 20 | E |
| 1 | 4.55 | 3.92 |
| 2 | 7.22 | 4.25 |
| 3.5 | 10.08 | 8.71 |
| 5 | 13.61 | 10.31 |
| 7.5 | 15.13 | 12.52 |
| 10 | 16.12 | 14.32 |

These results show a significant benefit for the copolymers of the invention under usage conditions where the wash time is short and the temperature low. Thus use of these polymers allows energy saving without loss of wash performance.

EXAMPLES 21 TO 24

Comparative Examples F and G Further detergency evaluations at 20° C.

In this experiment, the effect on detergency of replacing zeolite in a progressively by a polymer according to the invention was studied. A commercially available formulation (Comparative Example G) was also included in the study as a benchmark. The formulations are shown below.

Examples 21 to 24 used the 50/50 PVA/itaconate polymer of Example 7, while the commercial formulation Comparative Example G contained acrylate/maleate copolymer (Sokalan CP5).

Detergencies were compared in the tergotometer, using water of 20° French hardness (equivalent to $2 \times 10^{-3}$ mole/liter $Ca^{2+}$), using 1 liter of wash liquor and a product dosage of 5 g/liter. Each tergotometer pot contained four cotton test cloths containing builder-sensitive soil (oil, silica and ink) as detergency monitors, and four clean cotton cloths as soil redeposition monitors.

Detergency and antiredeposition results (reflectance differences at 460 nm) are also shown below. The results for Examples 20 to 23 and Comparative Example F showed that there was a small improvement in cleaning in changing from the zeolite to the polymer, and also a small reduction of redeposition. The polymer on its own (16 wt %) performed at least as well as the same amount of polymer with a fairly large amount of zeolite: there was no advantage from using a larger (20 wt %) amount of polymer.

EXAMPLES 21 TO 24

| | Comparative Examples F and G | | | | | |
|---|---|---|---|---|---|---|
| Example | F | 21 | 22 | 23 | 24 | G |
| Formulations (weight %) | | | | | | |
| cocoPAS | 1.7 | 1.7 | 1.7 | 1.7 | 1.7 | — |
| LAS | — | — | — | — | — | 6.5 |
| NI 7EO | 6.8 | 6.8 | 6.8 | 6.8 | 6.8 | 3.3 |
| NI 3EO | 8.5 | 8.5 | 8.5 | 8.5 | 8.5 | 6.2 |
| Tallow soap | 2 | 2 | 2 | 2 | 2 | 1.65 |
| Zeolite 4A | — | — | — | — | — | 27.12 |
| Zeolite MAP | 32 | 22 | 16 | — | — | — |
| Polymer of Example 7 | — | 10 | 16 | 20 | 16 | — |
| Acrylate/maleate polymer | — | — | — | — | — | 4.51 |
| Sodium carbonate | — | — | — | — | — | 18.4 |
| Sodium metaborate | 15 | 15 | 15 | 15 | 15 | — |
| Sodium tetraborate | 11.52 | 11.52 | 11.52 | 11.52 | 11.52 | — |
| Sodium silicate | 0.45 | 0.45 | 0.45 | 0.45 | 0.45 | 0.46 |
| Antifoam, bleach ingredients, SCMC, enzymes Water, minors, salts to balance | 10.47 | 10.47 | 10.47 | 10.47 | 10.47 | 16.30 |
| Results (delta R460) | | | | | | |
| Detergency | 31.8 | 32.5 | 33.2 | 32.4 | 33.2 | 31.2 |
| Antiredeposition | −1.04 | −0.66 | −0.25 | −0.08 | −0.14 | −1.4 |

All these formulations performed slightly better than the commercial formulation G, especially where redeposition was concerned, despite the significantly higher wash pH of the latter (10.5 as compared with 9.1).

EXAMPLES 25 TO 27

Comparative Examples H and J

These Examples illustrate the capability of copolymers of the present invention to form flexible, cold-water-soluble films superior to those obtainable from itaconate homopolymers.

The compositions of the polymers were as follows (IA=itaconic acid):

| Example | IA | Vinyl Alcohol | Vinyl Acetate | Mol wt. $M_n$ | $M_w$ |
|---|---|---|---|---|---|
| 25* | 50 | — | 50 | 19,500 | 39,600 |
| 26 | 50 | 50 | — | 18,000 | 31,000 |
| 27 | 50 | 50 | — | 20,050 | 34,900 |
| H | 100 | — | — | 22,000 | 51,000 |
| J | 100 | — | — | 11,500 | 58,000 |

*The polymer used for Example 25 was the polymer of Example 3.

The table below shows the solubility (the time for 0.1 g of polymer to dissolve in 200 ml deionized water at 25° C.); and the flexibility (assessed subjectively) of a film cast from each polymer.

| Example | Solubility | Flexibility |
| --- | --- | --- |
| 25 | 10 min | good |
| 26 | 21 min | good |
| 27 | 50 min | good |
| H | 116 min | brittle |
| J | 56 min | brittle |

The advantages of the films obtained from the polymers according to the invention are clear.

EXAMPLE 28

Preparation of Copolymer (III) ITA/VA (50/50) and Mw 5300

Itaconic acid (22.7 g, 0.174 mol) and vinyl acetate (15.0 g, 0.174 mol) were stirred with degassed 0.5M hydrochloric acid (80 ml) at 40° C. Sodium persulphate (0.5g) was added in four portions over a period of 48 hours. The resulting copolymer was isolated by precipitation into acetone. It was then purified further by two more precipitations into acetone from concentrated aqueous solutions.

To obtain the sodium salt, the copolymer was then dissolved in water, neutralized with 6% sodium hydroxide solution to pH 8.5 and then freeze-dried. The yield was 44%.

| Polymer Characterization | | | |
| --- | --- | --- | --- |
| (ITA):(VA) | $M_n$ | $M_w$ | D |
| 50:50 | 3,000 | 5,300 | 1.8 |

EXAMPLE 29

Preparation of Copolymer (IV)—ITA/VA (70/30) and Mw 20,500

This copolymer was prepared using the same method as described in Examples 1 and 2.

| Polymer Characterization | | | |
| --- | --- | --- | --- |
| (ITA):(VA) | $M_n$ | $M_w$ | D |
| 70:30 | 8,600 | 20,500 | 2.4 |

EXAMPLE 30

Preparation of Copolymer (V)—ITA/VA (20/80) and Mw 29,000

Sodium dodecyl sulphate (0.2 g) and itaconic acid (9.1 g, 0.07 mole) were dissolved in water (240 ml) and the solution was degassed at 60° C. Vinyl acetate (24.1 g, 0.28 mole) was then added and the mixture stirred. After 30 minutes 0.2 g of sodium persulphate initiator in water (4 ml) was added and polymerization was left for 6 hours. Another 0.3 g of the initiator in water (6 ml) was added incrementally over a period of 72 hours.

The polymerization liquor was concentrated to dryness using a rotary evaporator. The solid obtained was dissolved in acetone and the copolymer precipitated into diethyl ether. The process was repeated twice giving a white material. The copolymer was vacuum dried at 30° C. Yield 12.9 g (39%).

To obtain the sodium salt, the copolymer was dissolved in water (200 ml), neutralized with sodium hydroxide at room temperature to pH 8.5 and then freeze-dried. Yield 11.3 g (31%).

| Polymer Characterization | | | |
| --- | --- | --- | --- |
| (ITA):(VA) | $M_n$ | $M_w$ | D |
| 20:80 | 8,200 | 29,000 | 3.55 |

EXAMPLES 31-32

Set-up Scaling Experiments

The build-up of scale (calcium carbonate) on dishes in a machine dish wash process was investigated in small scale model scaling experiments. The wash cycli in such experiments are simulated by heating a washing solution containing pre-weighed glass slides. The weight increase of these slides during a 9 cycle build-up experiment is considered to be due to the deposition scale. A combined main wash and final rinse experiment was used to study scale protection with a main wash composition.

Main Wash/Final Rinse Experiment

In a 3 liter beaker glass, 2.7 gram of a composition is added to 1.5 liter of hard water. This water is made by adding calcium chloride, magnesium chloride and sodium bicarbonate to demineralized water in such amounts that a total water hardness of 40° French[1] (molar ratio Ca/Mg:4/1) and a temporary (bicarbonate) hardness of 32° French[2] is obtained. After placing pre-weighed glass slides (5×5×0.1 cm)in this solution, the temperature is raised from 20° to 65° C. at a rate of 2.5° C. per minute, and kept constant at 65° C. for 12 minutes. This temperature profile simulates a main wash cycle and is obtained using a submerged electrical heating element and a programmable temperature controller. At the end of this cycle the slides are taken out of the solution. One slide is used for the determination of the scale formation during this cycle and is replaced by a new slide. Subsequently, a final rinse cycle is simulated by adding the remaining slides to 1.5 liter of water of the same hardness. At the same time, 1.5 ml of the main wash solution (simulating a 1/1,000 carry-over from the main wash) is added. This final rinse solution is then heated from 20° C. to 70° C. (2.5° C./rain) and kept isothermal for 10 minutes. At the end of this cycle, again one slide is removed for analysis and replaced by a new one. Generally this procedure is repeated nine times.

1) 1° FH. (Ca and/or Mg) is equivalent to 0.1 mmol/l $CaCO_3$.

2) 1° FH. ($HCO_3$) is equivalent to 0.2 mmol/l $NaHCO_3$.

| Mainwash Base Composition (parts by weight) | |
| --- | --- |
| Sodium citrate | 43.0 |
| Sodium disilicate | 34.0 |
| Sodium perborate mono-hydrate | 6.8 |
| TAED | 4.2 |
| Laponite ® clay | 1.7 |
| Nonionic surfactant | 1.7 |

The experiments were carried out with:
(a) The above mainwash base composition.
(b) The above base composition+2.5% CP5*.
(c) The above base composition+2.5% ITA/VA 50/50 copolymer of $M_w$ 62,500.
(d) The above base composition+2.5% ITA/VA 80/20 copolymer of $M_w$ 81,800.

(VI) The above base composition +2.5% ITA/VA 20/80 copolymer of $M_w$ 29,000.

(VII) The above base composition +2.5% ITA/VA 50/50 copolymer of $M_w$ 5,300.

(VIII) The above base composition +2.5% ITA/VA 70/30 copolymer of $M_w$ 20,500.

* maleic anhydride/acrylic acid copolymer ex BASF

The results are shown in the following Table I:

TABLE I

| Scale Build-up on Glasses After 9 Wash Cycli | |
|---|---|
| Composition | Weight increase (mg/slide) |
| A | 45 |
| B | ~2 |
| C | 26 |
| D | 35 |
| VI | ~2 |
| VII | ~2 |
| VIII | ~2 |

We claim:

1. A detergent composition comprising at least one detergent-active compound and also comprising as a detergency builder a block copolymer comprising
   (i) from 20 to 95 mole % of monomer units of the formula I

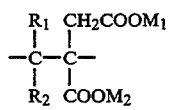

wherein each of $R_1$ and $R_2$, which may be the same or different, represents a hydrogen atom, a methyl group or an ethyl group, and each of $M_1$ and $M_2$, which may the same or different, is a hydrogen atom or a solubilising cation; and (ii) from 5 to 80 mole % of monomer units of the formula II:

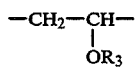

wherein $R_3$ represents a hydrogen atom or the group —$COR_4$, wherein $R_4$ is a $C_{1-4}$ alkyl group, the copolymer having a number-average molecular weight of at least 10,000 and a weight-average molecular weight of at least 15,000.

2. A detergent composition as claimed in claim 1, wherein $R_4$ in the formula II represents a methyl group.

3. A detergent composition as claimed in claim 1, wherein $R_1$ and $R_2$ in the formula I both represent hydrogen atoms.

4. A detergent composition as claimed in claim 1, wherein the block copolymer comprises from 30 to 95 mole % of units (i) and from 5 to 70 mole % of units (ii).

5. A detergent composition as claimed in claim 4, wherein the block copolymer comprises from 40 to 60 mole % of units (i) and from 40 to 60 mole % of units (ii).

6. A detergent composition as claimed in claim 1, containing from 1 to 80 wt % of the block copolymer.

7. A detergent composition as claimed in claim 1, comprising from 0.5 to 60 wt % of detergent-active compound and from 15 to 80 wt % of detergency builder comprising the block copolymer.

8. A detergent composition as claimed in claim 1, comprising:
   (a) from 5 to 60 wt % of detergent-active compound,
   (b) from 15 to 80 wt % of detergency builder comprising:
      (b1) a crystalline aluminosilicate, and
      (b2) a copolymer as defined in claim 1,
   (c) optionally other detergent ingredients to 100 wt %.

9. A detergent composition as claimed in claim 8, wherein the crystalline aluminosilicate (b1) is selected from zeolite A, zeolite P having a silicon to aluminium ratio not exceeding 1.33 (zeolite MAP), and mixtures thereof.

10. A machine dishwashing composition comprising a block copolymer comprising:
    (i) from 20 to 95 mole % of monomer units of the formula I:

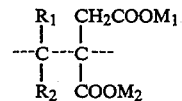

wherein each of $R_1$ and $R_2$, which may be the same or different, represents a hydrogen atom, a methyl group or an ethyl group, and each of $M_1$ and $M_2$, which may be the same or different, is a hydrogen atom or a solubilizing cation; and (ii) from 5 to 80 mole % of monomer units of the formula II:

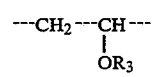

wherein $R_3$ represents a hydrogen atom or the group —$COR_4$, wherein $R_4$ is a $C_{1-4}$ alkyl group, said polymer having a weight average molecular weight of about 1,000 to 60,000.

11. An antiscaling rinse composition comprising a block copolymer as defined in claim 10.

* * * * *